United States Patent [19]

Orita

[11] 4,190,143

[45] Feb. 26, 1980

[54] METHOD AND DEVICES FOR SAFETY FOR MECHANICAL PRESSES

[75] Inventor: Naoki Orita, Machida, Japan

[73] Assignee: Amada Company, Limited, Isehara, Japan

[21] Appl. No.: 865,191

[22] Filed: Dec. 28, 1977

[30] Foreign Application Priority Data

Dec. 28, 1976 [JP] Japan ................................ 51-157441
Mar. 29, 1977 [JP] Japan ................................ 52-34024

[51] Int. Cl.$^2$ ...................... F16D 21/08; F16D 67/02; F16P 3/00

[52] U.S. Cl. ...................................... 192/145; 100/53; 192/48.5; 192/85 A; 192/129 B

[58] Field of Search .................... 192/48.3, 48.5, 48.7, 192/84 AA, 85 A, 87.1, 87.11, 87.13, 129 R, 129 A, 129 B, 145; 100/53

[56] References Cited

U.S. PATENT DOCUMENTS

| | | | |
|---|---|---|---|
| 3,113,653 | 12/1963 | Volkovitsky | 192/145 X |
| 3,504,774 | 4/1970 | Rode | 192/48.5 X |
| 3,509,976 | 5/1970 | Coon | 192/129 B X |

*Primary Examiner*—Allan D. Herrmann
*Attorney, Agent, or Firm*—Wigman & Cohen

[57] ABSTRACT

This disclosure relates to a method and apparatus for facilitating safe operation of mechanical presses. The press includes a press ram mounted on a crank shaft and adapted for reciprocatory movement along a vertical path between uppermost and lowermost points on the path. A motor is provided for turning the crank shaft through 360 degrees rotation including an upper dead center position. The press further includes main clutch and brake means for disconnecting the crank shaft from the motor and stopping the ram at the uppermost point of its path of travel after completion of a stroking cycle. At this point the crank shaft is at its upper dead center position. The press also includes an auxiliary clutch which is operatively connected in series with the main clutch and which is normally engaged for transmitting power from the motor to the crank shaft. The auxiliary clutch will be automatically disengaged if the crank shaft unintentionally rotates past its upper dead center position upon completion of a stroking cycle of the ram, thereby preventing a hazardous double stroke upon failure of the main clutch or the like.

8 Claims, 7 Drawing Figures

METHOD AND DEVICES FOR SAFETY FOR MECHANICAL PRESSES

BACKGROUND OF THE INVENTION

1. Field of the Invention

The present invention relates generally to mechanical presses for processing workpieces such as metals or other materials and more particularly to a method and devices which facilitates safe operation of mechanical presses.

2. Description of the Prior Art

In mechanical presses, a ram holding an upper tool or die is vertically moved in processing operations by means of a crank shaft or eccentric shaft toward and away from a lower tool or die to process workpieces which are placed on the lower die. For manual operations in which workpieces are manually fed onto and removed from the lower die by hand, mechanical presses have to be so designed that the ram may be positively stopped at its uppermost limit of travel after completion of each working cycle or stroke. As is well known, mechanical presses are provided with a clutch and a brake which are often provided as an assembly and are mostly pneumatically operated, and the ram is stopped when the clutch and the brake are simultaneously operated. Of course, the clutch is so designed as to connect and disconnect the crank shaft for driving the ram with the power source such as a flywheel and a motor, while the brake is operated to stop the crank shaft simultaneously when the clutch disconnects the same from the power source.

In mechanical presses, it has been that the ram often fails to stop at its uppermost travelling limit after completing it stroke and will repeat another stroke because of malfunction of the clutch and the brake or electric or pneumatic means for controlling these elements, e.g., a solenoid operated valve, or for any other reasons. Needless to say, there is a danger of injuring the operator of the press if the ram repeats an unintended stroke without stopping at its uppermost travelling limit. Actually, accidents in operations with mechanical presses have happened mostly from such unintentional repeated strokes of the rams.

Although some mechanical presses are doubly equipped with solenoid operated valves for controlling the clutch and the brake for extra safety, of course this arrangement could not prevent the ram from unintentionally repeating its stroke owing to malfunctions other than that of the solenoid operated valve. Also, some presses are so constructed that the crank shaft is mechanically and forcibly stopped by a stop means such as a pin from unintentionally rotating past its upper dead center to stop the ram from double stroking past its uppermost travelling limit. However, this arrangement not only could not positively prevent the ram from double stroking except when the clutch is incompletely connecting the crank shaft with the power source, but also it tends to damage the press and its components because of the shock occuring when the ram is forcibly stopped.

SUMMARY OF THE INVENTION

It is a primary object of the present invention to provide a method in which a ram in mechanical presses can be positively and safely stopped from repeating an unintended stroke past its uppermost travelling limit after a completion of a stroke without causing any damage to the press.

It is another object of the present invention to provide a safety device for mechanical presses which can positively and safely stop the ram from repeating an unintended stroke past its uppermost travelling limit after a completion of a stroke without causing any damage to the press.

Basically, these objects are accomplished by providing a mechanical press with a second clutch means disposed between its main clutch and its ram, and which pneumatically connects the crank shaft with the power source in normal operations and which is operated by a spring or springs to disconnect the same as soon as the crank shaft begins to unintentionally rotate past its upper dead center to allow the ram to repeat an unintended stroke.

In this connection, it is another object of the present invention to provide an auxiliary clutch means for disconnecting the crank shaft with the power source when the main clutch is not positively disengaged at the completion of a stroking cycle.

Other and further objects and advantages of the present invention will be apparent from the following description and accompanying drawings which, by way of illustration, show preferred embodiments of the present invention and the principle thereof.

DESCRIPTION OF THE PREFERRED EMBODIMENTS

Figure 1:
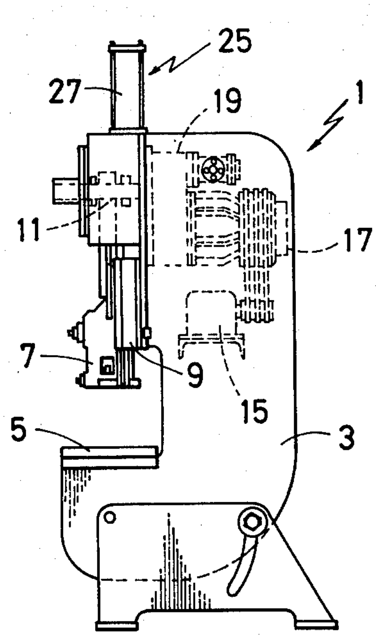
FIG. 1 is a side view of a mechanical press embodying the principles of the present invention.
Figure 2:
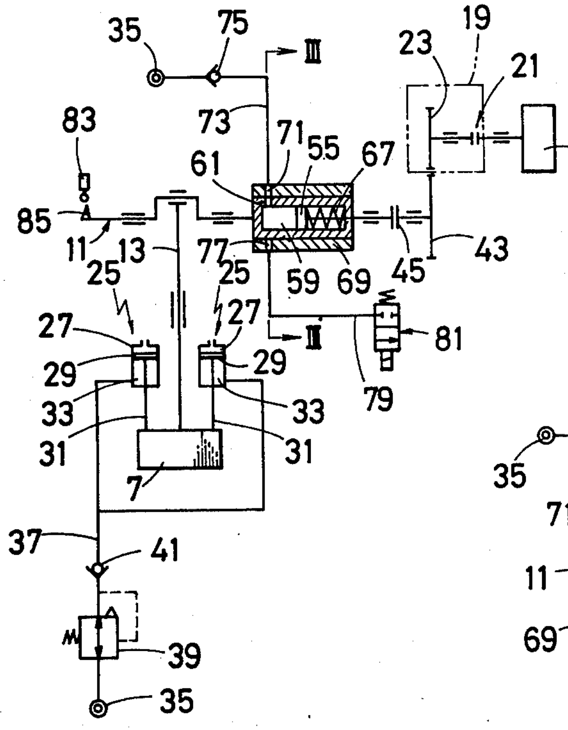
FIG. 2 is a schematic illustration showing an embodiment of the principles of the present invention.
Figure 3:
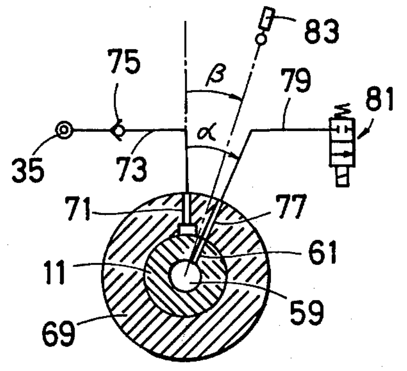
FIG. 3 is a schematic illustration showing the embodiment of FIG. 2 in cross-section along the line III—III of FIG. 2.
Figure 5:
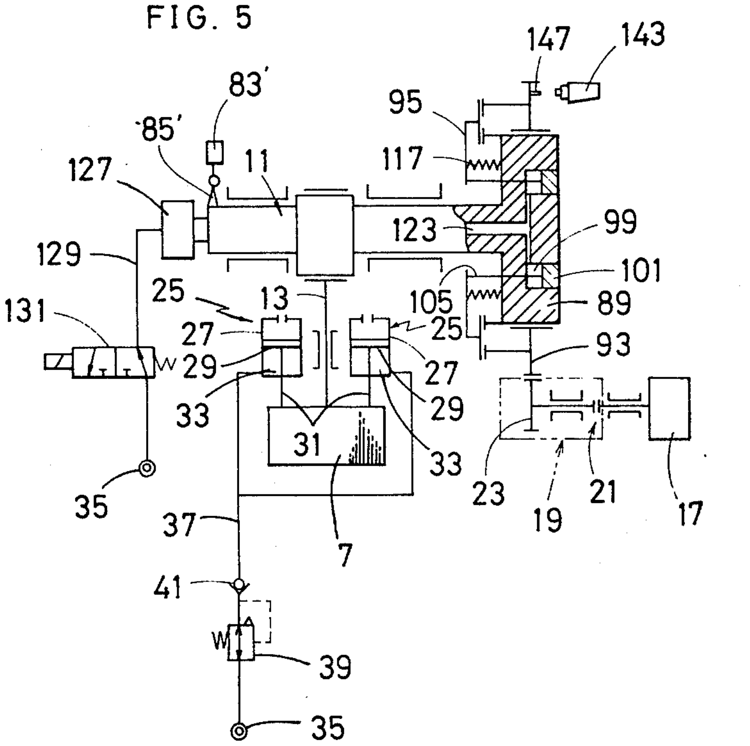
FIG. 5 is a schematic illustration showing another embodiment of the principles of the present invention.

Referring to FIG. 1, a mechanical press generally designated by the numeral 1 is conventional in that it is constructed of a C-shaped frame 3 and has a worktable 5 on which a lower tool or die (not shown) is mounted. As is also conventional, the press 1 is provided at its front upper portion with a ram 7 which is to be provided at its lower end with an upper tool or die (not shown) and is so mounted as to be vertically moved along a guide means 9 by a crank shaft or eccentric shaft 11 through a connecting rod 13 (FIG. 3). Also, the crank shaft 11 for driving the ram 7 is driven in the conventional manner by a motor 15 through a flywheel 17 and a transmission 19 which is schematically shown in FIGS. 2 and 5 as including a clutch and brake assembly 21 and having an output gear 23. However, the crank shaft 11 according to the present invention is different from conventional ones in that it is so constructed as to be connected with and disconnected from the output gear 23, as will be described hereinafter. Also, of course the clutch and brake assembly 21 and the output gear 23 can be provided in different manners other than those shown in FIGS. 2 and 5. Thus, the ram 7 is vertically lowered by the crank shaft 11 to the worktable 5 to process a workpiece placed thereon when the clutch and brake assembly 21 is operated to transmit the power to the crank shaft 11 in the conventional manner.

As is also conventional, the ram 7 is equipped with counterbalance means 25 for counterbalancing the moving weight of the ram 7 and other members attached thereto. The counterbalance means 25 may be of any type, but they comprise pneumatic cylinders 27 each having a piston 29 and a piston rod 31 fixed thereto in the preferred embodiment. Also, although two counterbalance means 25 are shown in FIGS. 2 and 5, any number of them may be employed depending upon the type and the size of the press 1. The counterbalance means 25 are mounted to stationary portions on the crown or the uprights of the press 1, and their piston rods 31 are attached to the ram 7 so that they may be moved together therewith. In order to counterbalance the moving weight of the ram 7, the counterbalance means 25 are supplied with air into their cylinders 33 from an air source 35 through a conduit 37 which is provided with a reducing valve 39 and a check valve 41. Thus, the ram 7 is counterbalanced by the counterbalance means 25, and it is lowered to the worktable 5 against the air pressure in the chambers 33 of the counterbalance means 25 so as to process the workpiece. As will be understood as the description proceeds, the counterbalance means 25 are most effectively utilized as buffers or shock absorbers to softly stop the ram 7 without shock from unintendedly double stroking according to the present invention.

Figure 4:
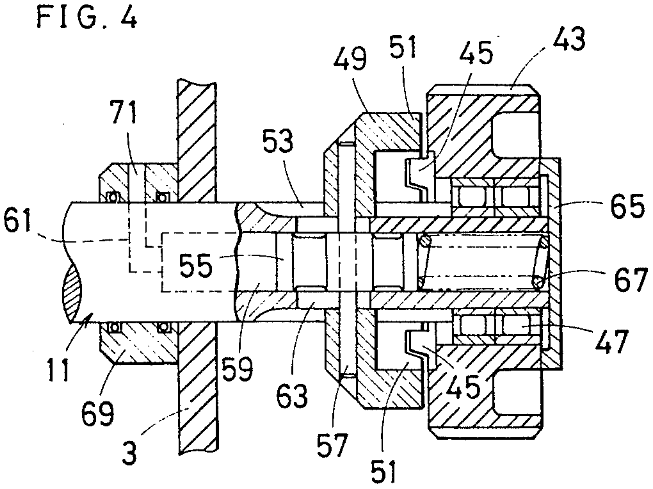
FIG. 4 is a fragmentary sectional view of the embodiment shown in FIGS. 2 and 3.

Referring to FIGS. 2 and 4, the crank shaft 11 is provided at its end adjoining the transmission 19 with a gear 43 which is provided at its inner side with a plurality of radially disposed claws 45. The gear 43 is rotatably mounted on the crank shaft 11 by means of a bearing 47 so as to engage the output gear 23 of the transmission 19. Also, a clutch ring 49 having a plurality of radially disposed claws 51 is axially slidably provided on the end of the crank shaft 11 adjacent to the gear 43 so that its claws 51 may engage with the claws 45 of the gear 43. It will be understood that the clutch ring 49 having the claws 51 and the claws 45 of the gear 43 act jointly as a so-called dog clutch or claw clutch. As seen from FIG. 4, the clutch ring 49 is so arranged as to slide along a plurality of splines 53 formed on the end of the crank shaft 11 adjacent to the gear 43. Thus, when the claws 51 of the clutch ring 49 are kept in engagement with the claws 45 of the gear 43, the crank shaft 11 is rotated by the gear 43 to drive the ram 7, as long as the clutch and brake assembly 21 is transmitting the power from the flywheel 17 to drive the output gear 23. On the other hand, when the clutch ring 49 is slid along the splines 53 on the crank shaft 11 away from the gear 43 to bring its claws 51 out of engagement with the claws 45 thereof, the crank shaft 11 is no longer driven by the gear 43, even if the clutch and brake assembly 21 continues to transmit the power from the motor 15.

In order to bring the claws 51 of the clutch ring 49 into or out of engagement with the claws 45 of the gear 43, the clutch ring 49 is so arranged as to be pneumatically moved by a cylindrical plunger member 55 which may be a piston having a piston rod. As best shown in FIG. 4, the clutch ring 49 is fixed to the plunger member 55 by a pin 57 in such a manner as to radially project therefrom like a flange. On the other hand, the plunger member 55 is slidably inserted in an elongate cylindrical plunger chamber 59 which is formed through the axial center of the end of the crank shaft 11 and is provided at its inner end opposite to the gear 43 with a radially formed port 61 from which the air is supplied. In this connection, the radial port 61 of the crank shaft 11 is so formed as to right upwardly open when the crank shaft 11 is at its upper dead center to position the ram 7 at its uppermost travelling limit. Also, in order to enable the plunger member 55 and the clutch ring 49 to move together inside and outside the crank shaft 11, respectively, the crank shaft 11 is formed at its diametrically opposite portions adjacent to the gear 43 with a pair of axially elongate slots 63 in and along which the pin 57 is movable. Furthermore, the outer end of the plunger chamber 59 is closed by a lid member 65, and a spring 67 is inserted in the plunger chamber 59 between the plunger member 55 and the lid member 65 to bias the plunger member 55 away from the lid member 65. Thus, when the plunger chamber 59 is being supplied with the air from the radial port 61, the plunger member 55 is pressed against the spring 67 so as to keep the claws 51 of the clutch ring 49 in contact with the claws 45 of the gear 43. On the contrary, on discharge of the air from the plunger chamber 59, the plunger member 55 is moved by the spring 67 so as to bring the clutch ring 49 out of engagement with the claws 45 of the gear 43 to disconnect the crank shaft 11 from the power source.

As best shown in FIG. 4, the crank shaft 11 is journaled in a hub member 69 which is so fixed to a portion of the frame 3 of the press 1 as to hold a portion of the crank shaft 11 where the radial port 61 is formed to outwardly open. The hub member 69 is formed at its uppermost portion with a vertical inlet port 71 which is bored vertically and radially from the uppermost portion of the hub member 69 toward the axis of the crank shaft 11 on and along a vertical plane where the radial port 61 of the crank shaft 11 is rotated around the axis of the crank shaft 11. It will be readily apparent that the radial port 61 of the crank shaft 11 is connected with the radial inlet port 71 of the hub member 69 when the crank shaft 11 is at its upper dead center where the ram 7 is at its uppermost travelling limit, since the radial port 61 is so formed as to be right upwardly open when the crank shaft 11 is at its upper dead center as described hereinbefore. Also, as shown in FIG. 2, a conduit 73 having a check valve 75 is provided to connect the air source 35 with the port 71. Thus, the plunger chamber 59 is supplied with the air from the air source 35 through the conduit 73, the inlet port 71 of the hub member 69 and the radial port 61 of the crank shaft 11, each time when the ports 71 and 61 are connected with each other when the crank shaft 11 is rotated to its upper dead center to bring the ram 7 to its uppermost travelling limit.

As shown in FIGS. 2 and 3, the hub member 69 is formed with a radial outlet port 77 which is bored radially toward the axis of the crank shaft 11 at a slight angle "$\alpha$" shown in FIG. 3 to the radial port 71 on and along the same plane as that where the radial port 71 is rotated around the axis of the crank shaft 11. The outlet port 77 is connected by a conduit 79 with a solenoid operated valve 81 which is normally closed. It will be understood that the radial port 61 of the crank shaft 11 is brought into connection with the outlet port 77 of the hub member 69 when the crank shaft 11 is rotated past its upper dead center through the angle "$\alpha$".

The solenoid operated valve 81 is so arranged as to be operated by a limit switch 83 which is workable when contacted by a dog 85 fixed to a portion of the crank shaft 11. The limit switch 83 is so disposed as to be actuated by the dog 85 when the crank shaft 11 is rotated past its upper dead center through an angle "β" which is smaller than the angle "α" of the outlet port 77 as shown in FIG. 3. Also, the limit switch 83 is so arranged in a well-known manner as to be actuated by the dog 85 not when the crank shaft 11 is normally rotated but only when the crank shaft 11 is unintendedly rotated past its upper dead center to repeatedly move the ram 7 after a completion of its stroke without stopping at its uppermost travelling limit.

From the above description, it will be now understood that the ram 7 is stopped from unintendedly double stroking as soon as the crank shaft 11 begins to unintentionally rotate past its upper dead center. Of course, the crank shaft 11 is rotated by the clutch ring 49 in normal operations since the plunger member 55 is pushed to keep the clutch ring 49 in engagement with the claws 45 of the gear 43 by the air supplied into the plunger chamber 39 from the conduit 73. When the crank shaft 11 is unintentionally rotated through the angle "β" shown in FIG. 3 past its upper dead center, the limit switch 83 is actuated by the dog 85 in a well-known manner to make the solenoid operated valve 81 open. As the result, when the crank shaft 11 is rotated through the angle "α" to bring its radial port 61 into connection with the outlet port 77 of the hub member 69, the air acting on the plunger 55 in the plunger chamber 59 will be exhausted to the atmosphere through the conduit 79 and the solenoid operated valve 81. On exhaustion of the air from the plunger chamber 59, the plunger 55 is moved by the spring 67 to bring the clutch ring 49 out of engagement with the claws 45 of the gear 43. Accordingly, the crank shaft 11 is disconnected from the power source such as the gear 43 and is stopped from driving the ram 7, even if the clutch and brake assembly 21 continues to transmit the power. Accordingly, the ram 7 is softly stopped without shock from lowering by the air acting in the counterbalance means 25, although it is going to lower by inertia. Thus, it will be appreciated that the counterbalance means 25 act as buffers or shock-absorbers to softly or shocklessly stop the ram 7 against inertia without damaging any portion of the press 1 after the crank shaft 11 is disconnected from the power source.

Figure 6:
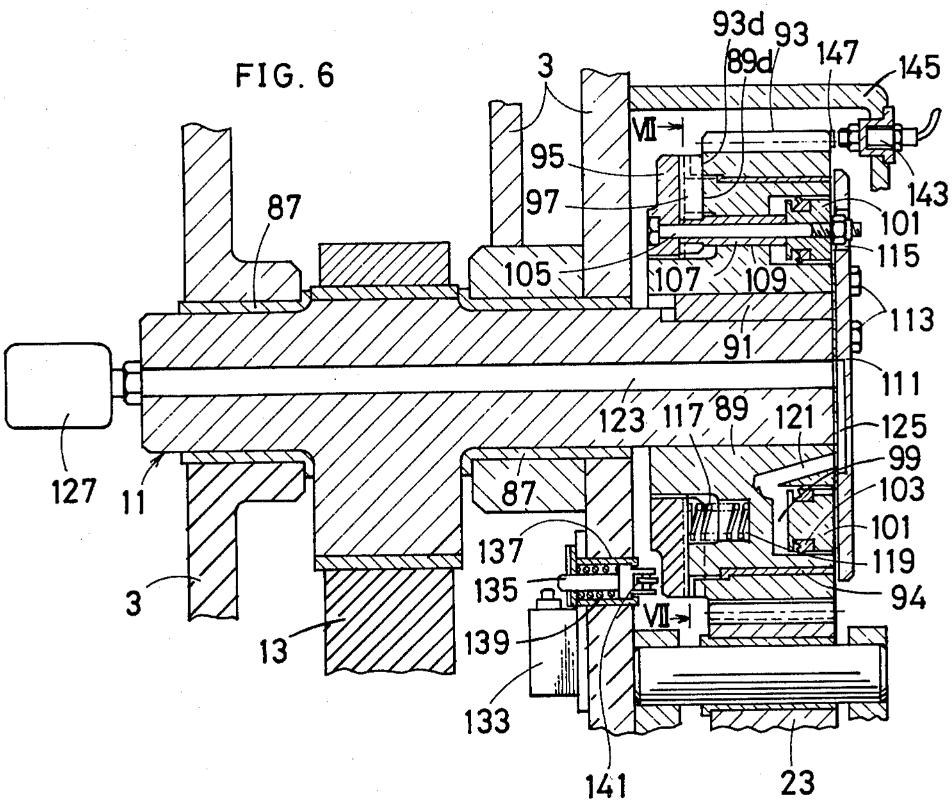
FIG. 6 is a fragmentary sectional view of the embodiment shown in FIG. 5.
Figure 7:
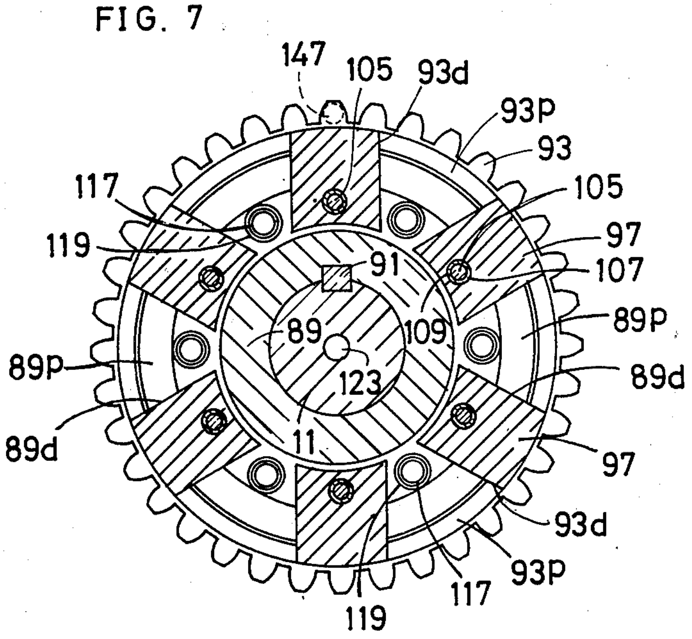
FIG. 7 is a sectional view of the embodiment shown in FIGS. 5 and 6 along the line VII—VII of FIG. 6.

Aside from the embodiment illustrated in FIGS. 2–4, the advantages of the present invention are also attainable with the second embodiment illustrated in FIGS. 5–7. The second embodiment will be described with use of the same numerals as the first embodiment shown in FIGS. 2–4 with regard to the elements common to both embodiments.

Referring to FIGS. 5 and 6, the crank shaft 11 shown as an eccentric shaft in the preferred embodiment is rotatably mounted on the ram 7 by means of bearings 87 and it is provided at its end adjoining the transmission 19 with a ring member 89 which is fixed thereto by a key 91 but may be formed as a flange thereon. As seen from FIG. 6, the ring member 89 is formed at its inner face with a plurality of radial depressions **89*d* which are equally spaced from each other and are formed to radially extend with equal widths so that a plurality of sector-like projections 89*p* are formed therebetween. An annular gear 93 is freely rotatably mounted on and around the ring member 89 by means of an annular bearing or bushing 94 so as to engage the output gear 23 of the transmission 19. As seen from FIG. 6, in order to hold the annular gear 93 on the ring member 89, the ring member 89 and the annular gear 93 are formed at their inner circumferential edges with a convex annular step and a concave annular step, respectively. The annular gear 93 is also formed at its inner face with a plurality of radial depressions 93*d* which are equally spaced from each other and are formed to radially extend with the same widths as the depressions 89*d* of the ring member 89 so that a plurality of sector-like projections 93*p* are formed therebetween. Also, a clutch ring 95 is provided around the crank shaft 11 in such a manner as to face with the depressions 89*d* and 93*d* and the projections 89*p* and 93*p* of the ring member 89 and the annular gear 93. The clutch ring 95 is provided at its face on the side of the ring member 89 and the annular gear 93 with a plurality of elongate claw members 97 which are as many as the depressions 89*d* and 93*d* of the ring member 89 and the annular gear 93. As seen from FIG. 7, the claw members 97 of the clutch ring 95 are equal in width to the depressions 89*d* and 93*d* of the ring member 89 and the annular gear 93 and equal in length to the added radial lengths of both of them. More particularly, the claw members 97 of the clutch ring 95 are radially arranged on the face of the clutch ring 95 so that they may be fitted in both the depressions 89*d* and 93*d* of the ring member 89 and the annular gear 93 to connect them with each other. It will be readily understood that when the clutch members 97 of the clutch ring 95 are engaged with both the depressions 89*d* and 93*d* of the ring member 89 and the annular gear 93, the crank shaft 11 is rotated by the output gear 23 through the annular gear 93, the clutch ring 95 and the ring member 89**.

As best shown in FIG. 6, the ring member 89 is formed at its outer side opposite to its depressions **89*d* with an annular chamber 99 which has an equal width throughout its length and depth and extends circumferentially at an equal radial distance from the axis of the crank shaft 11. An annular piston member 101 having seal members 103 is slidably inserted in the annular chamber 99 so that it may be moved in the axial direction of the crank shaft 11. The annular piston member 101 is integrally connected with the clutch ring 95 by a plurality of elongate bolts 105 and cylindrical spacers 107 through bores 109 which are formed through the ring member 89 from the end of the annular chamber 99 in parallel with and at an equal radial distance from the axis of the crank shaft 11. More particularly, the elongate bolts 105 are inserted through the annular piston member 101, the cylindrical spacers 107 and the clutch ring 95 to integrally connect them all, and the cylindrical spacers 107 are slidably inserted in the bores 109. Also, a disk plate 111 is fixed to the ring member 89 by a plurality of bolts 113 to cover the end of the crank shaft 11 and hold the annular gear 93 in position on the ring member 89. As shown in FIG. 6, the disk plate 111 is formed with a plurality of openings 115 to allow the ends of the elongate bolts 105 to project out. Thus, when the annular chamber 99 is supplied with the air, the annular piston member 101 is moved in the annular chamber 99 to pull the clutch ring 95 by means of the elongate bolts 105 and the cylindrical spacers 107 so as to bring the claw members 97 of the clutch ring 95 into engagement with the depressions 89*d* and 93*d* of the ring member 89 and the annular gear 93**.

As best seen from FIG. 6, a plurality of springs 117 are provided between the clutch ring 95 and the ring member 89 to bias the clutch ring 95 away from the ring member 89. In the preferred embodiment, the springs 117 are inserted in a plurality of bores 119 which are formed in the ring member 89 on its side facing with the clutch ring 95 in parallel with and at an equal radial distance from the axis of the crank shaft 11. Thus, the clutch ring 95 is pushed by the springs 117 away from the ring member 89 and the annular gear 93 to bring its claw members 97 out of engagement with their depressions 89*d* and 93*d*, when the air acting on the annular piston member 101 is exhausted from the annular chamber 99.

In order to supply and discharge the air into and from the annular chamber 99, there are provided a plurality of passages 121 which are formed through the ring member 89 to connect with the annular chamber 99. The passages 121 are connected with an elongate bore 123 which is formed through the axis of the crank shaft 11. In the preferred embodiments as shown in FIG. 6, the passages 121 are connected with the elongate bore 123 by a plurality of grooves 125 which are formed on the inner side of the disk plate 111 in such a manner as to radially extend from the end of the elongate bore 123 of the crank shaft 11. Therefore, the passages 121 are so formed as to rather radially extend from the annular chamber 99 to open to the radial inner circumference of the ring member 89 on the side of the disk plate 111. In this connection, a single one of the passages 121 and a single one of the grooves 125 may be provided for the plurality of them.

As shown in FIGS. 5 and 6, the elongate bore 123 is connected at its end opposite to the grooves 125 with a swivel joint 127 with which a conduit 129 is connected from the air source 35 through a solenoid operated valve 131. As seen from FIG. 5, the solenoid operated valve 131 is so arranged as to supply the air from the air source 35 normally when not energized and exhaust the air to the atmosphere when energized. Also, the solenoid operated valve 131 is so arranged as to be energized by a limit switch 83' which is workable when contacted by a dog 85' which is fixed to a portion of the crank shaft 11. The limit switch 83' is so arranged as to be actuated by the dog 85' to energize the solenoid operated valve 131 only when the crank shaft 11 has begun to unintendedly rotate past its upper dead center after a completion of a stroke of the ram 7 in all the same manner as the embodiment shown in FIGS. 2, 3 and 4. Thus, normally the air from the air source 35 is supplied from the conduit 129 through the swivel joint 127, the elongate bore 123, the grooves 125 and the passages 121 into the annular chamber 99 to enable the annular piston member 101 to hold the claw members 97 of the clutch ring 95 in engagement with the depressions 89*d* and 93*d* of the ring member 89 and the annular gear 93. However, once the crank shaft 11 has begun to rotate past its upper dead center, the solenoid operated valve 131 is energized by the limit switch 83' to allow the air to exhaust therethrough, and accordingly the springs 117 will push the clutch ring 95 to pull the claw members 97 out of engagement with the depressions 89*d* and 93*d* of the ring member 89 and the annular gear 93.

As shown in FIG. 6, a limit switch 133 and a dog member 135 are provided on a portion of the frame 3 of the press 1 in the vicinity of the clutch ring 95. The limit switch 133 is so arranged as to stop the motor 15 when contacted by the dog member 135, while the dog member 135 is so provided as to be pushed by the clutch ring 95 into contact with the limit switch 133 when the clutch ring 95 is moved out of engagement with the depressions 89*d* and 93*d* of the ring member 89 and the annular gear 93. In the preferred embodiment, the dog member 135 is slidably inserted in a cylindrical case 137 horizontally fixed to the frame 3 of the press 1 and is biased by a spring 139 toward the clutch ring 95, and it is provided at its end with a roller 141 to be touched by the clutch ring 95. Thus, when the clutch ring 95 is moved out of engagement with the ring member 89 and the annular gear 93 to disconnect the crank shaft 11 from the power source, the dog member 135 is pushed by the clutch ring 95 into contact with the limit switch 133 to stop the motor 15 from driving the press 1. Accordingly, once the crank shaft 11 has begun to unintendedly rotate past its upper dead center to allow the ram 7 to unintendedly double stroke, not only is the crank shaft 11 stopped from being driven by the annular gear 93 but also the press 1 is completely stopped from being driven by the motor 15.

Referring to FIGS. 5 and 6, in order to align radially the annular gear 93 in phase with the clutch ring 95, a proximity switch 143 is provided in the vicinity of the annular gear 93 on a bracket 145 fixed to a portion of the frame 3 of the press 1, and an actuating member 147 for actuating the proximity switch 143 is fixed to the radially outer edge of the outer side of the annular gear 93. In the well-known manner, the proximity switch 143 is so arranged as to generate a signal when the actuating member 147 is in the proximity thereof. Therefore, the actuating member 147 is so located on the annular gear 93 that it may be in the proximity of the proximity switch 143 when the claw members 97 of the clutch ring 95 are in engagement with the depressions 89*d* and 93*d* of the ring member 89 and the annular gear 93 with the crank shaft 11 put in a pre-determined rotational position. Thus, in order to align radially the annular gear 93 in phase with the clutch ring 95 it is only necessary to firstly rotate the crank shaft 11 to the pre-determined rotational position and then rotate the annular gear 93 on the ring member 89 until the proximity switch 143 signals that the actuating member 143 has come into the proximity thereof. Incidentally, it is necessary to align radially the clutch ring 95 in phase with the annular gear 93 after the clutch ring 95 has been moved out of engagement with the depressions 89*d* and 93*d* of the ring member 89 and the annular gear 93.

As is now apparent from the above description, the ram 7 is softly or shocklessly stopped by the counterbalance means 25 from unintendedly double stroking after a completion of a stroking cycle as soon as the crank shaft 11 begins to rotate past its upper dead center in the second embodiment as well as in the previously-described first embodiment. When the crank shaft 11 unintendedly begins to rotate past its upper dead center and the limit switch 83' is actuated by the dog 85' in the same well-known manner as in the first embodiment, the solenoid operated valve 131 is energized to allow the air pressurized in the annular chamber 99 to exhaust therefrom through the passages 121, the grooves 125, the elongate bore 123 of the crank shaft 11 and the swivel joint 127. Accordingly, the annular piston member 101 can no longer pull the clutch ring 95 against the springs 117 and the clutch ring 95 is pushed by the springs 117 to bring the claw members 97 out of engagement with the depressions 89*d* and 93*d* of the ring member 89 and the annular gear 93. Consequently, the ring member 89 is disconnected from the annular gear 93 to stop driving the crank shaft 11, and accordingly the ram 7 is no longer driven by the crank shaft 11 and is softly or shocklessly stopped from double stroking by the counterbalance means 25 without damaging any portion of the press 1. Also, as soon as the clutch ring 95 is pushed by the springs 117 away from the ring member 89 and the annular gear 93, the dog member 135 is pushed thereby into contact with the limit switch 133 to stop the motor 15. Furthermore, the annular gear 93 and the clutch ring 95 can be radially aligned in phase with each other by firstly turning the crank shaft 11 to a pre-determined rotational position and then rotating the annular gear 93 until the actuating member 147 is brought into the proximity of the proximity switch 143.

As has been so far described, according to the present invention, the crank shaft 11 is disconnected from the power source in the event that it begins to unintendedly rotate past its upper dead center to allow the ram 7 to double stroke after a completion of a stroke. Also, on disconnection of the crank shaft 11 from the power source, the ram 7 is softly or shocklessly stopped from double stroking by the counterbalance means 25 without damaging any portion of the press 1.

Although only preferred forms of the present invention have been illustrated and described herein, it should be understood that the device is capable of modification by one skilled in the art without departing from the principles of the invention. Accordingly, the scope of the invention is to be limited only by the claims appended hereto.

I claim:

1. A mechanical press comprising a press ram mounted on a crank shaft adapted for reciprocatory movement along a vertical path between uppermost and lowermost points on said path, motor means operatively coupled to said crank shaft for turning said crank shaft through 360° rotation including an upper dead center position, main clutch and brake means for disconnecting said crank shaft from said motor means and stopping said ram at said uppermost point after completion of a stroking cycle when said crank shaft is at said upper dead center position, auxiliary clutch means operatively connected in series with said main clutch means and which is normally engaged for transmitting power from said motor means to said crank shaft, and means for automatically disengaging said auxiliary clutch means if said crank shaft unintentionally rotates past said upper dead center position upon completion of a stroking cycle of said ram.

2. A mechanical press as defined in claim 1, and further including counterbalance means for shocklessly and gradually stopping said ram after disengagement of said auxiliary clutch means.

3. A mechanical press as defined in claim 1, wherein said means for automatically disengaging said auxiliary clutch means includes resilient means biassing said auxiliary clutch means toward the disengaged position thereof, pneumatic means opposing the force of said resilient means and normally maintaining said auxiliary clutch means in the engaged position thereof, and means for venting said pneumatic means if said crank shaft unintentionally rotates past said upper dead center position upon completion of a stroking cycle of said ram thereby permitting said resilient means to disengage said auxiliary clutch means.

4. A mechanical press as defined in claim 3, wherein said pneumatic means includes a piston disposed within a cylinder and operatively opposing said resilient means, means for connecting said cylinder to a source of pneumatic fluid for urging said piston against said resilient means, said venting means including means connecting said cylinder with the atmosphere, solenoid-operated valve means for normally maintaining said cylinder closed to the atmosphere, and switch means for energizing said solenoid-operated valve means to open said cylinder to the atmosphere when said crankshaft unintentionally rotates a predetermined number of degrees past said upper dead center position thereof upon completion of a stroking cycle of said ram.

5. A mechanical press as defined in claim 4, wherein said means connecting said cylinder with the atmosphere includes port means radially extending through said crankshaft and communicating with said solenoid-operated valve.

6. A mechanical press as defined in claim 4, wherein said piston is an annular member and said cylinder is an annular chamber, said means for connecting said cylinder to a source of pneumatic fluid includes an elongate bore extending longitudinally through said crank shaft, and wherein said solenoid-operated valve connects said annular chamber to said source of pneumatic fluid when not energized and connects said annular chamber to the atmosphere when energized.

7. A mechanical press as defined in claim 6, and further including limit switch means operatively connected to said auxiliary clutch means for stopping said motor means upon disengagement of said auxiliary clutch means.

8. A method of preventing unintended repeated strokes of the ram during operation of a mechanical press upon failure of the main clutch or the like wherein the ram is mounted on a crank shaft and adapted for reciprocatory movement along a vertical path between uppermost and lowermost points on the path, and wherein the crank shaft is rotatable through 360 degrees and the main clutch is disengageable to stop the ram after the completion of a stroking cycle at the uppermost point thereof when the crank shaft is at the upper dead center position thereof, comprising the steps of:

(a) providing an auxiliary clutch which is normally engaged for transmitting power to the crankshaft;
(b) sensing when the crankshaft unintentionally rotates past the upper dead center position thereof upon completion of a stroking cycle of the ram;
(c) generating a signal indicative of said sensing step; and
(d) automatically disengaging said auxiliary clutch in response to said signal to prevent an unintended stroking cycle of said ram.

* * * * *